United States Patent
Spors

(10) Patent No.: US 11,085,832 B2
(45) Date of Patent: Aug. 10, 2021

(54) MITIGATION OF FLUID INGRESS VIA CONVECTION VENTING ON ELECTRONIC DEVICES

(71) Applicant: Johnson Controls Technology Company, Plymouth, MI (US)

(72) Inventor: Daniel J. Spors, West Bend, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 566 days.

(21) Appl. No.: 15/247,888

(22) Filed: Aug. 25, 2016

(65) Prior Publication Data

US 2018/0058941 A1   Mar. 1, 2018

(51) Int. Cl.
   *G01K 1/08*    (2021.01)
   *F24F 13/20*   (2006.01)

(52) U.S. Cl.
   CPC ............... *G01K 1/08* (2013.01); *F24F 13/20* (2013.01); *F24F 2013/207* (2013.01)

(58) Field of Classification Search
   CPC ...... G01K 1/08; F24F 13/20; F24F 2013/207; B60H 1/243; F24D 19/065; F24D 19/06; F24D 19/062; F24D 19/064; F24D 19/061; F24D 19/067; F24D 19/068
   USPC .................. 454/184, 289, 290, 158
   See application file for complete search history.

(56) References Cited

U.S. PATENT DOCUMENTS

| | | | | |
|---|---|---|---|---|
| 1,275,923 A | * | 8/1918 | Hook | F24D 19/06 237/79 |
| 1,329,836 A | * | 2/1920 | Hook | F24D 19/06 237/79 |
| 1,650,569 A | * | 11/1927 | Nickle | F24D 19/0085 454/307 |
| 1,664,171 A | * | 3/1928 | Hicks | F24H 3/002 126/90 A |

(Continued)

FOREIGN PATENT DOCUMENTS

| CN | 302042137 | 8/2005 |
|---|---|---|
| CN | 2798516 Y | 7/2006 |

(Continued)

OTHER PUBLICATIONS

Extended Search Report for European Application No. 17186332.7, dated Jan. 30, 2018, 8 pages.

(Continued)

*Primary Examiner* — Steven S Anderson, II
(74) *Attorney, Agent, or Firm* — Foley & Lardner LLP

(57) ABSTRACT

A fluid protection cover for an electronic device includes a cowl configured to fit at least partially over an electronic device enclosure and shield a convection vent opening in the electronic device enclosure against fluid ingress, an opening located underneath the cowl and configured to permit the passage of air from an interior region of the electronic device enclosure to the ambient air, and a primary louver located underneath the cowl. The primary louver includes an inclined surface configured to direct fluid away from the opening. The fluid protection cover further includes a first (Continued)

SECTION A-A end cap and a second end cap. Each end cap is configured to fit at least partially over an exterior face of the electronic device enclosure and join the cowl to the primary louver.

21 Claims, 7 Drawing Sheets

(56) References Cited

U.S. PATENT DOCUMENTS

| | | | |
|---|---|---|---|
| 1,845,243 A * | 2/1932 | Cox | F24D 19/1006 |
| | | | 165/248 |
| 1,871,008 A * | 8/1932 | Rentz | F02N 19/10 |
| | | | 122/17.2 |
| 2,954,456 A * | 9/1960 | Calhoun | F24H 3/002 |
| | | | 392/353 |
| 3,050,866 A * | 8/1962 | Macemon | A47L 15/488 |
| | | | 34/182 |
| 3,165,624 A * | 1/1965 | Cunningham | F24H 3/002 |
| | | | 165/184 |
| 3,294,158 A * | 12/1966 | Baljet | F24D 19/04 |
| | | | 165/128 |
| 3,359,965 A * | 12/1967 | Milligan | F24C 3/042 |
| | | | 126/92 B |
| 3,408,480 A * | 10/1968 | Peltak | F24H 3/002 |
| | | | 165/55 |
| 3,448,243 A * | 6/1969 | Ripple | F24H 3/002 |
| | | | 165/182 |
| 3,488,475 A * | 1/1970 | Gronwoldt | F24D 19/06 |
| | | | 165/55 |
| 3,543,003 A * | 11/1970 | Dincher | F24H 3/002 |
| | | | 165/182 |
| 3,588,774 A * | 6/1971 | Caveney | H01H 37/14 |
| | | | 337/100 |
| 3,596,058 A * | 7/1971 | Steiner | F24H 3/002 |
| | | | 165/129 |
| 3,627,984 A * | 12/1971 | Bollinger | F24H 9/1863 |
| | | | 165/182 |
| 3,737,624 A * | 6/1973 | Eilenberger | A47J 37/0611 |
| | | | 174/257 |
| 3,876,469 A * | 4/1975 | Schimke | A47L 15/488 |
| | | | 134/95.2 |
| 4,273,990 A * | 6/1981 | Steiner | H05B 3/50 |
| | | | 165/182 |
| 4,311,898 A * | 1/1982 | McMillan | F24H 7/0416 |
| | | | 126/400 |
| 4,430,521 A * | 2/1984 | Ofield | F24H 9/1863 |
| | | | 174/663 |
| 4,467,179 A * | 8/1984 | Ali | F24H 3/002 |
| | | | 16/431 |
| 4,761,537 A * | 8/1988 | Hayes | F24C 7/043 |
| | | | 165/182 |
| 5,105,730 A * | 4/1992 | Smith | B60H 1/00692 |
| | | | 251/901 |
| D333,574 S | 3/1993 | Ackeret | |
| 5,505,377 A * | 4/1996 | Weiss | G05D 23/1904 |
| | | | 165/270 |
| 5,597,033 A * | 1/1997 | Cali | F24D 19/04 |
| | | | 165/171 |
| 5,825,973 A * | 10/1998 | Lehoe | F24H 3/002 |
| | | | 392/353 |
| 5,884,690 A * | 3/1999 | Zussman | F24D 19/04 |
| | | | 118/504 |
| 5,963,708 A * | 10/1999 | Wong | F28D 1/0226 |
| | | | 122/488 |
| 6,085,985 A * | 7/2000 | LaSelva | F24D 19/06 |
| | | | 165/55 |
| 6,207,236 B1 * | 3/2001 | Araki | C09D 127/12 |
| | | | 427/386 |
| D518,744 S | 4/2006 | Rosen | |
| D556,061 S | 11/2007 | Rosen | |
| D560,686 S | 1/2008 | Kim | |
| 7,405,930 B2 | 7/2008 | Hongo et al. | |
| D582,802 S | 12/2008 | Branson et al. | |
| D592,982 S | 5/2009 | Burt et al. | |
| D606,537 S | 12/2009 | Ferrari et al. | |
| 7,789,129 B1 * | 9/2010 | Barden | F24D 19/0087 |
| | | | 165/244 |
| D637,992 S | 5/2011 | Tom et al. | |
| D648,641 S | 11/2011 | Wallaert et al. | |
| D648,642 S | 11/2011 | Wallaert et al. | |
| D652,034 S | 1/2012 | Ferrari et al. | |
| 8,149,222 B2 | 4/2012 | Hsieh et al. | |
| D666,198 S | 8/2012 | Van Den Nieuwenhuizen et al. | |
| D666,510 S | 9/2012 | Beland et al. | |
| D672,666 S | 12/2012 | Rhodes et al. | |
| D673,467 S | 1/2013 | Lee et al. | |
| D675,204 S | 1/2013 | Hofer et al. | |
| D676,768 S | 2/2013 | Eyring et al. | |
| D676,769 S | 2/2013 | Eyring et al. | |
| D677,660 S | 3/2013 | Groene et al. | |
| D678,084 S | 3/2013 | Beland et al. | |
| D679,205 S | 4/2013 | Eyring et al. | |
| D684,872 S | 6/2013 | Bias et al. | |
| D687,388 S | 8/2013 | Baumgartner et al. | |
| D688,955 S | 9/2013 | Deligiannis et al. | |
| D694,195 S | 11/2013 | Gammon et al. | |
| D694,718 S | 12/2013 | Baumgartner et al. | |
| D699,130 S | 2/2014 | Rhodes et al. | |
| D705,094 S | 5/2014 | Eyring et al. | |
| D708,977 S | 7/2014 | Corso et al. | |
| D715,165 S | 10/2014 | Deligiannis et al. | |
| D715,166 S | 10/2014 | Rhodes | |
| D717,673 S | 11/2014 | Eyring et al. | |
| D727,180 S | 4/2015 | Lai et al. | |
| D729,793 S | 5/2015 | Hickok et al. | |
| D733,591 S | 7/2015 | Golden et al. | |
| D734,179 S | 7/2015 | Golden et al. | |
| D737,155 S | 8/2015 | Gmyr et al. | |
| D738,232 S | 9/2015 | Eyring et al. | |
| D738,755 S | 9/2015 | Druce | |
| D738,756 S | 9/2015 | Jiang et al. | |
| D743,349 S | 11/2015 | Leeland et al. | |
| D744,433 S | 12/2015 | Baumgartner et al. | |
| D748,082 S | 1/2016 | Lee et al. | |
| D751,426 S | 3/2016 | Edgar | |
| D752,568 S | 3/2016 | Kang et al. | |
| 9,282,656 B2 | 3/2016 | Degner et al. | |
| D753,106 S | 4/2016 | Chao | |
| D758,217 S | 6/2016 | Kumfer et al. | |
| 9,400,526 B2 | 7/2016 | Casebolt et al. | |
| D763,707 S | 8/2016 | Sinha et al. | |
| D769,231 S | 10/2016 | Kwak et al. | |
| D770,449 S | 11/2016 | Bae et al. | |
| D772,735 S | 11/2016 | Mansueto et al. | |
| D778,245 S | 2/2017 | Feldstein et al. | |
| D787,465 S | 5/2017 | Levi et al. | |
| D796,352 S | 9/2017 | Morneau et al. | |
| D801,288 S | 10/2017 | Kim et al. | |
| D808,415 S | 1/2018 | Butcher et al. | |
| D812,048 S | 3/2018 | Mazz et al. | |
| 9,976,774 B1 * | 5/2018 | Markow | F24H 3/0411 |
| D828,816 S | 9/2018 | Spors et al. | |
| D834,607 S | 11/2018 | Kim et al. | |
| D842,741 S | 3/2019 | Bakker et al. | |
| D842,874 S | 3/2019 | Tashiro et al. | |
| D849,038 S | 5/2019 | Amin et al. | |
| D849,044 S | 5/2019 | Amin et al. | |
| D849,774 S | 5/2019 | Lee et al. | |
| D857,709 S | 8/2019 | Jeon et al. | |
| D857,740 S | 8/2019 | Ko et al. | |
| D858,535 S | 9/2019 | Evans et al. | |
| D858,562 S | 9/2019 | Zhu et al. | |
| D859,443 S | 9/2019 | Kim et al. | |
| 2001/0020646 A1 * | 9/2001 | Hebert | F24C 7/065 |
| | | | 237/79 |
| 2006/0182429 A1 * | 8/2006 | Shapiro | F24H 3/0411 |
| | | | 392/365 |
| 2007/0076356 A1 | 4/2007 | Chiang | |
| 2008/0029613 A1 * | 2/2008 | Friedlich | F24D 19/04 |
| | | | 237/59 |

(56) References Cited

U.S. PATENT DOCUMENTS

| | | | | |
|---|---|---|---|---|
| 2008/0178567 | A1* | 7/2008 | Varrichio | B01D 46/10 55/495 |
| 2009/0085713 | A1* | 4/2009 | Tsang | F24C 7/105 338/23 |
| 2011/0011560 | A1* | 1/2011 | Bono | F24D 3/145 165/67 |
| 2012/0055651 | A1* | 3/2012 | Coe | F28F 9/001 165/53 |
| 2012/0251963 | A1 | 10/2012 | Barker | |
| 2012/0298330 | A1 | 11/2012 | Mysse | |
| 2013/0020329 | A1 | 1/2013 | Lin et al. | |
| 2013/0161489 | A1 | 6/2013 | Gardner, Jr. | |
| 2013/0279142 | A1 | 10/2013 | Wang | |
| 2013/0338839 | A1 | 12/2013 | Rogers et al. | |
| 2014/0043256 | A1 | 2/2014 | Wu et al. | |
| 2014/0085818 | A1 | 3/2014 | Lee | |
| 2014/0141708 | A1* | 5/2014 | Baker | F04D 19/002 454/249 |
| 2014/0273616 | A1* | 9/2014 | Eichert | H01R 13/5227 439/521 |
| 2014/0300567 | A1 | 10/2014 | Inata et al. | |
| 2015/0021064 | A1 | 1/2015 | Wang et al. | |
| 2015/0062087 | A1 | 3/2015 | Cho et al. | |
| 2015/0070838 | A1 | 3/2015 | Casebolt et al. | |
| 2016/0273785 | A1* | 9/2016 | Marino | F24D 19/06 |
| 2016/0324026 | A1 | 11/2016 | Kang et al. | |
| 2017/0097193 | A1* | 4/2017 | Stanley | F24D 19/04 |
| 2018/0058713 | A1 | 3/2018 | Spors | |
| 2018/0058941 | A1 | 3/2018 | Spors | |

FOREIGN PATENT DOCUMENTS

| | | |
|---|---|---|
| CN | 3677789 | 8/2007 |
| CN | 300763793 | 4/2008 |
| CN | 201369893 Y | 12/2009 |
| CN | 301076701 | 12/2009 |
| CN | 301262175 | 6/2010 |
| CN | 301318189 | 8/2010 |
| CN | 301318218 | 8/2010 |
| CN | 301318220 | 8/2010 |
| CN | 301367662 | 10/2010 |
| CN | 301379502 | 11/2010 |
| CN | 301425146 | 12/2010 |
| CN | 301437651 | 1/2011 |
| CN | 301596683 | 6/2011 |
| CN | 301640279 | 8/2011 |
| CN | 301671557 | 9/2011 |
| CN | 301900552 | 5/2012 |
| CN | 301936315 | 5/2012 |
| CN | 301936316 | 5/2012 |
| CN | 301936441 | 5/2012 |
| CN | 301966054 | 6/2012 |
| CN | 301966088 | 6/2012 |
| CN | 302009181 | 7/2012 |
| CN | 302009186 | 7/2012 |
| CN | 302042060 | 8/2012 |
| CN | 302042135 | 8/2012 |
| CN | 302062604 | 9/2012 |
| CN | 302244026 | 12/2012 |
| CN | 302269957 | 1/2013 |
| CN | 302313577 | 2/2013 |
| CN | 202799474 U | 3/2013 |
| CN | 302360122 | 3/2013 |
| CN | 202949685 U | 5/2013 |
| CN | 302503612 | 7/2013 |
| CN | 302517156 | 7/2013 |
| CN | 203243628 U | 10/2013 |
| CN | 302908442 | 8/2014 |
| CN | 302908443 | 8/2014 |
| CN | 303030615 | 12/2014 |
| CN | 301936456 | 5/2015 |
| CN | 303238413 | 6/2015 |
| CN | 303246894 | 6/2015 |
| CN | 303255433 | 6/2015 |
| CN | 303255434 | 6/2015 |
| CN | 303337349 | 8/2015 |
| CN | 303375958 | 9/2015 |
| CN | 303385632 | 9/2015 |
| CN | 303394163 | 9/2015 |
| CN | 303451296 | 11/2015 |
| CN | 303603907 | 3/2016 |
| CN | 303653904 | 4/2016 |
| CN | 205232622 U | 5/2016 |
| CN | 303709538 | 6/2016 |
| CN | 303717815 | 6/2016 |
| CN | 303717816 | 6/2016 |
| CN | 303717817 | 6/2016 |
| CN | 303717819 | 6/2016 |
| CN | 303717823 | 6/2016 |
| CN | 303726743 | 6/2016 |
| CN | 303726744 | 6/2016 |
| CN | 303737244 | 7/2016 |
| CN | 303737245 | 7/2016 |
| CN | 303789869 | 8/2016 |
| CN | 303814825 | 8/2016 |
| EM | 941031-001 | 2/1994 |
| EM | 946447-001 | 11/1994 |
| EM | 946448-001 | 11/1994 |
| EM | 000907720-0001 | 4/2008 |
| EM | 001944638-0001 | 11/2011 |
| EM | 002016436-0001 | 3/2012 |
| EM | 001345771-0031 | 9/2012 |
| EM | 002103713-0001 | 9/2012 |
| EM | 002165068-0001 | 1/2013 |
| EM | 002221440-0004 | 4/2013 |
| EM | 002297606-0001 | 8/2013 |
| EM | 002299909-0002 | 8/2013 |
| EM | 002379198-0001 | 12/2013 |
| EM | 002418830-0040 | 3/2014 |
| EM | 002433060-0005 | 3/2014 |
| EM | 002476010-0001 | 6/2014 |
| EM | 002526251-0003 | 8/2014 |
| EM | 002609768-0001 | 1/2015 |
| EM | 002763698-0016 | 9/2015 |
| EM | 002767970-0003 | 9/2015 |
| EM | 002842880-0004 | 10/2015 |
| EM | 003074640-0003 | 4/2016 |
| EM | 003339936-0001 | 8/2016 |
| EP | 2741017 A1 * 6/2014 | F24D 19/065 |
| GB | 2 472 381 A | 2/2011 |
| IN | 239736-0001 | 9/2011 |
| JP | D1527751 | 5/2015 |
| KR | 300513953.0000 | 12/2008 |
| KR | 300559936.0000 | 4/2010 |
| KR | 300559937.0000 | 4/2010 |
| KR | 300563103.0000 | 5/2010 |
| KR | 300563104.0000 | 5/2010 |
| KR | 300597072.0000 | 4/2011 |
| KR | 300597075.0000 | 4/2011 |
| KR | 300597078.0000 | 4/2011 |
| KR | 300597085.0000 | 4/2011 |
| KR | 300597095.0000 | 4/2011 |
| KR | 300597103.0000 | 4/2011 |
| KR | 300597104.0000 | 4/2011 |
| KR | 300597105.0000 | 4/2011 |
| KR | 300597106.0000 | 4/2011 |
| KR | 300597109.0000 | 4/2011 |
| KR | 300743169.0000 | 5/2014 |
| KR | 300788997.0000 | 3/2015 |
| KR | 300803551.0000 | 6/2015 |
| KR | 300810461.0000 | 8/2015 |
| WO | WO-D075763-002 | 3/2011 |
| WO | WO D088823-003 | 11/2015 |
| WO | WO-2018/156137 A1 | 8/2018 |

OTHER PUBLICATIONS

Notice of Allowance for U.S. Appl. No. 29/602,691, dated Apr. 18, 2018, 8 pages.

Office Action on CN 201710730257.6, dated Jul. 15, 2020, 11 pages with English translation.

(56) References Cited

OTHER PUBLICATIONS

Office Action on EP 17186332.7, dated Nov. 9, 2020, 6 pages.

* cited by examiner

SECTION A-A

SECTION B-B

MITIGATION OF FLUID INGRESS VIA CONVECTION VENTING ON ELECTRONIC DEVICES

BACKGROUND

The present application relates generally to the field of accessories for electronic HVAC devices. The present application relates more specifically to a cover that may be installed on an electronic device to protect the device against fluid ingress.

As electronic HVAC equipment becomes smaller, faster, and more feature-laden, it consumes more power and generates more heat. Heat can be detrimental to the performance, reliability, and useful life of electronic equipment, therefore it must be carefully managed. Often, heat is managed wholly or partially via convection airflow that necessitates the use of vent openings in the device enclosure. At the same time, these devices are often installed in environments where they must be regularly cleaned with a fluid solution. Fluid that enters the device via the vent openings may cause electrical short-circuits or corrosion, significantly degrading the useful life of the device. Accordingly, there is a need for a cover for an electronic device that both permits convection airflow and prevents fluid ingress.

SUMMARY OF THE INVENTION

One embodiment relates to a fluid protection cover for an electronic device. The fluid protection cover includes a cowl configured to fit at least partially over an electronic device enclosure and shield a convection vent opening in the electronic device enclosure against fluid ingress, an opening located underneath the cowl and configured to permit the passage of air from an interior region of the electronic device enclosure to the ambient air, and a primary louver located underneath the cowl. The primary louver includes an inclined surface configured to direct fluid away from the opening. The fluid protection cover further includes a first end cap and a second end cap. Each end cap is configured to fit at least partially over an exterior face of the electronic device enclosure and join the cowl to the primary louver.

In some embodiments, the cowl has a substantially curved shape configured to minimize an amount of cleaning fluid extracted from a cleaning fluid applicator. In some embodiments, the primary louver includes a lip located inside the opening and configured to prevent fluid from splashing into the opening.

In some embodiments, the fluid protection cover is maneuverable between a locked position and a unlocked position. The locked position is configured to prevent the fluid protection cover from being removed from the electronic device enclosure. In some embodiments, the fluid protection cover includes a retention feature configured to retain the fluid protection cover in the locked position.

In some embodiments, the retention feature includes a number of prongs extending from the cowl. The prongs are configured to pass through the convection vent opening in the electronic device enclosure and engage a surface located in the interior region of the electronic device enclosure.

In some embodiments, the end caps include a hole configured to permit passage of a tool configured to deflect the prongs and disengage the fluid protection cover from the electronic device enclosure. In some embodiments, the end caps also include a recess terminating at the hole. The recess is configured to direct fluid passing through the hole away from the convection vent opening. In other embodiments, the retention feature is an adhesive.

In some embodiments, the fluid protection cover includes a number of secondary louvers located underneath the cowl. The secondary louvers are configured to direct fluid away from the convection vent opening in the electronic device enclosure.

In some embodiments, the cowl is further configured to form a gap between a bottom edge of the cowl and a face of the electronic device enclosure to permit egress of fluid.

Another embodiment of the present disclosure is an enclosure for an electronic HVAC device. The enclosure includes a body. The body includes an interior region configured to substantially encapsulate electronic components and a number of convection vent openings configured to permit air passage out of the interior region. The enclosure further includes a cowl configured to shield at least one convection vent opening, an opening located underneath the cowl and configured to permit the passage of convection air from the convection vent openings to the ambient air, and a primary louver. The primary louver includes an inclined surface configured to direct fluid away from the opening.

In some embodiments, the cowl has a substantially curved shape configured to minimize an amount of cleaning fluid extracted from a cleaning fluid applicator.

In some embodiments, the primary louver further includes a lip located inside the opening and configured to prevent fluid from splashing into the opening.

In some embodiments, the enclosure further includes a number of secondary louvers located underneath the cowl. The secondary louvers are configured to direct fluid away from at least one convection vent opening.

In some embodiments, the cowl is further configured to form a gap between a bottom edge of the cowl and a face of the body to permit egress of fluid.

Another embodiment of the present disclosure is a system for protecting an electronic device from fluid ingress. The system includes an electronic device. The electronic device includes a vented enclosure configured to substantially encapsulate electronic components. The system further includes a fluid protection cover configured to fit at least partially over the electronic device. The fluid protection cover includes a cowl configured to shield the vented enclosure and an opening configured to permit convection air currents to exit the vented enclosure.

In some embodiments, the electronic device is a thermostat. In other embodiments, the electronic device is an environmental sensor.

In some embodiments, the fluid protection cover includes a louver located underneath the cowl. The louver is configured to direct fluid away from the opening and prevent fluid from splashing into the opening.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Referring generally to the FIGURES, a fluid protection cover for an electronic device is shown, according to an exemplary embodiment. The fluid protection cover described herein may be used with an electronic device (e.g., a thermostat or a sensor) in an HVAC system, building management system (BMS), or any other system configured to control the environmental conditions of a building. In some instances, these electronic devices are installed in buildings in which all surfaces that are routinely touched by occupants must be routinely sanitized or cleaned with a liquid cleaning solution to control the spread of germs and bacteria. Examples of these types of buildings might include, but are not limited to, a hospital, a research facility, a hotel, or a school.

For a variety of reasons, the electronic devices installed in these buildings often cannot be completely sealed against fluid ingress. For example, electronic devices often include cooling features designed to ensure that components mounted on circuit cards within the devices do not overheat. One common cooling technique is the use of vent openings to permit convection air currents to draw heat from the electronics and out of a device enclosure. Although these vent openings may be located on the bottom or sides of the enclosure, they are most effective at cooling the device when located both on the top and bottom of the enclosure. In other instances, one of the functions of the electronic device may be to sample a condition of air, thus requiring a means for air to enter the device and preventing the device from including protective seals. Locating openings at the top of a device enclosure for cooling or sampling purposes permits cleaning solution to enter the device when the cleaning solution is sprayed at or wiped across the device. This fluid ingress may result in device malfunction through several failure modes, including short-circuiting or corrosion of components. In some instances, these failures are sufficiently severe that they necessitate replacement of the electronic device. In other instances, the failures degrade the performance and reliability of the device.

Figure 1:
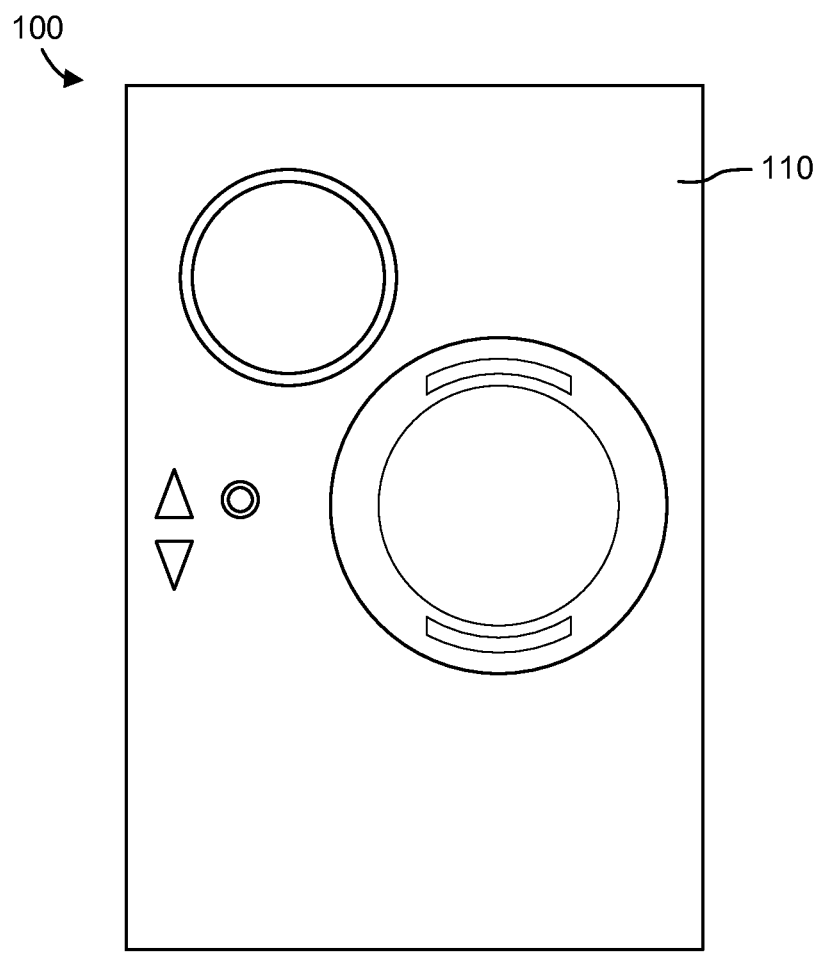
FIG. 1 is front elevation view schematic drawing of an electronic device vulnerable to fluid ingress, according to an example embodiment.

Referring to FIG. 1, a front view schematic drawing of electronic device 100 is depicted, according to an example embodiment. As described above, in some embodiments, electronic device 100 is an electronic thermostat or sensor configured for use in a building environmental management system; however, electronic device 100 may be any type of electronic device designed for convection cooling and susceptible to damage from fluid ingress. In some embodiments, electronic device 100 may be a wall-mounted sensor from the NS-7000 network sensor product series or the WRZ wireless room sensor product series, both of which are manufactured by Johnson Controls, Inc.

Electronic device 100 includes an electronic device enclosure 110. Electronic device enclosure 110 is configured to encapsulate the components of device 100. In some embodiments, these components may include one or more circuit card assemblies, control devices (e.g., actuators, buttons, etc.), and display screens. As described above, for various reasons, these components may not include prophylactic features against fluid ingress and may fail in a variety of modes after coming into contact with fluid (e.g., cleaning solution, water). For example, circuit card assemblies that do not have an applied conformal coat material may corrode in the presence of moisture.

Figure 2:
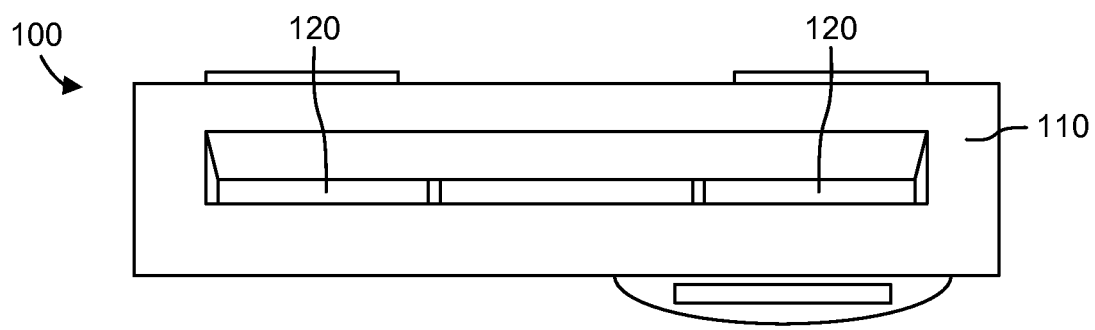
FIG. 2 is a top elevation view schematic drawing of the electronic device of FIG. 1, according to an example embodiment.

Referring now to FIG. 2, a top view schematic drawing of electronic device 100 is depicted, according to an example embodiment. Electronic device 100 includes a plurality of vent openings 120 on the top face of electronic device enclosure 110. The plurality of vent openings 120 may be any size or shape required to permit the convection airflow necessary to adequately cool device 100. In some embodiments, electronic device 100 may include additional vent openings on the sides, bottom, or front faces of electronic device enclosure 110. However, the vent openings 120 on the top face of electronic device enclosure 110 pose the greatest risk of damage due to fluid ingress. Fluid that enters device 100 via vent openings 120 on the top face of electronic device enclosure 110 will naturally flow down over the electronic components encapsulated by enclosure 110. Conversely, fluid that enters device 100 via vent openings 120 on the side faces of enclosure 110 will naturally flow down the inner faces of enclosure 110.

Figure 3:
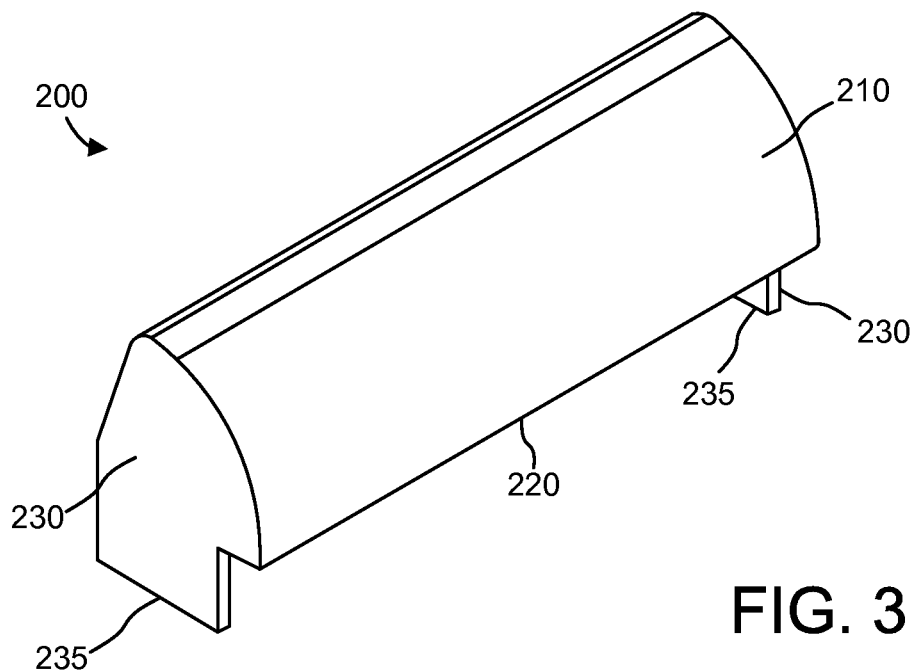
FIG. 3 is a perspective view schematic drawing of a fluid protection cover for an electronic device, according to an example embodiment.

Referring now to FIG. 3, a fluid protection cover 200 for an electronic device is depicted in a schematic drawing, according to an example embodiment. Fluid protection cover 200 is configured to shield the top face of electronic device enclosure 110, as described in FIGS. 1-2 in some embodiments. In some embodiments, fluid protection cover 200 is a separate component from electronic device 100, permitting cover 200 to be installed on or removed from electronic device 100 as desired. In other embodiments, the protective features of cover 200 is integrated into the design of device enclosure 110, preventing any disassembly of device 100 and cover 200.

Fluid protection cover 200 includes a cowl 210. Cowl 210 features curved geometry and terminates at bottom edge 220. The curved geometry of cowl 210 may be advantageous over a design with sharp or flared edges for several reasons in some embodiments. One reason is that a sharp edge is a geometric discontinuity that draws more fluid droplets to form from a fluid applicator (e.g., a rag, a sponge) than a curved face in some embodiments. Another reason is that a curved face provides a controlled path for droplets that do transfer from the fluid applicator to cowl 210 to travel away from any fluid-sensitive components in some embodiments.

Still referring to FIG. 3, fluid protection cover 200 terminates lengthwise at either end with end cap 230. The length of cover 200 may correspond with the length of electronic device 100 such that the interior faces of end caps 230 are either flush or substantially flush with the side faces of electronic device enclosure 110. In some embodiments, the bottom edges 235 of end caps 230 do not intersect with cowl bottom edge 220. This geometry permits end caps 230 to extend down the sides of electronic device enclosure 110 and provide a means to attach cover 200 to device 100 without cowl 210 obscuring the front face of device 100. Obscuring the front face of device 100 may be particularly undesirable because the front face often contains the device user interface (e.g., status display screens, control buttons) needed to operate the device.

Figure 4:
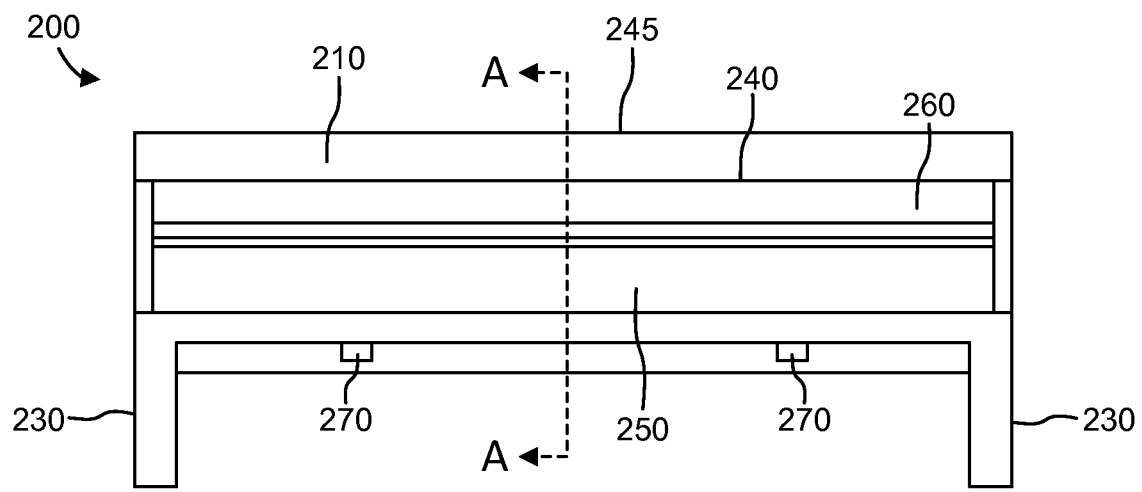
FIG. 4 is a rear elevation view schematic drawing of the fluid protection cover of FIG. 3, according to an example embodiment.
Figure 5:
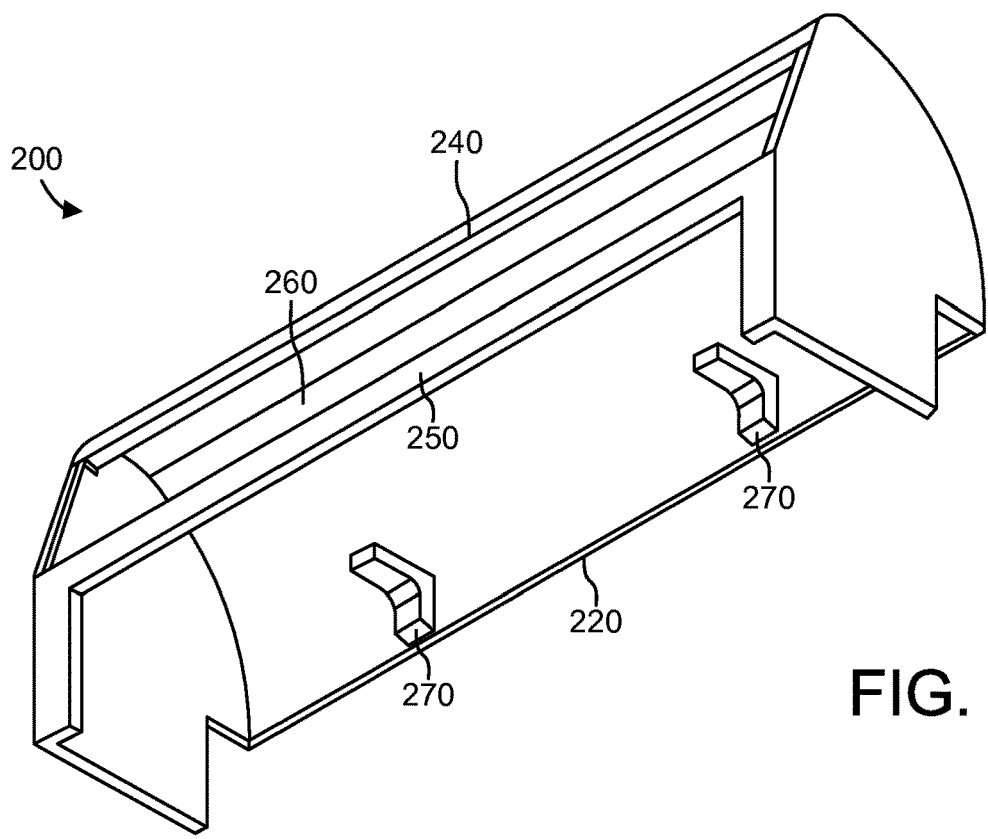
FIG. 5 is another perspective view schematic drawing of the fluid protection cover of FIG. 3, according to an example embodiment.

Turning now to FIGS. 4 and 5, additional views of fluid protection cover 200 are depicted in schematic drawings, according to an example embodiment. FIG. 4 depicts an elevation view of the opening 260 of fluid protection cover 200, while FIG. 5 depicts a perspective view of the opening 260. When installed on electronic device 100 (as depicted below in FIGS. 7-8), cover opening 260 may be located facing the surface on which device 100 is installed (e.g., the wall). Cowl bottom edge 220 may be located on the opposite side, near the front face of device 100.

Still referring to FIGS. 4 and 5, cover 200 is further shown to include cowl top edge 240 and primary louver 250. As depicted, cowl top edge 240 is not located coincident with cowl top surface 245. Instead, cowl 210 terminates at cowl top edge 240. Cowl top edge 240 is located below cowl top surface 245 to permit cowl top edge 240 to function as a "drip edge" that directs fluid to drip onto primary louver 250. In addition, cowl top edge 240 is located some distance below cowl top surface 245 such that cowl 210 covers a portion of the top of opening 260. This configuration is desirable because it ensures that cowl top surface 245 comprises the topmost surface of cover 200 and is the first point of cover 200 that comes into contact with any fluid transferred from a fluid applicator. Because cowl top surface 245 does not comprise a sharp edge, it minimizes the amount of cleaning fluid extracted from the fluid applicator.

Fluid that does collect along cowl top surface 245 travels substantially in one of two paths in some embodiments. The first path is toward cowl bottom edge 220. When the fluid reaches bottom edge 220, it forms droplets that may drip harmlessly down the front face of device enclosure 110. Because the front face of device enclosure 110 is unlikely to contain vent openings, there is a low risk that fluid traveling across the front face will encounter any path to enter device 100. The second path the fluid may travel after transferring to cowl top surface 245 is toward cowl top edge 240. Fluid that travels along the second path forms droplets when it reaches cowl top edge 240. These droplets may drip from cowl top edge 240 onto primary louver 250. Primary louver 250 is configured to include an inclined surface and a lip extending into opening 260. The lip prevents fluid that drips from cowl top edge 240 to the inclined surface from splashing into opening 260 and entering device 100. The inclined surface provides a controlled path for the fluid to travel down and away from opening 260, until it reaches and can drip harmlessly down the back face of device enclosure 110. End caps 230 are configured to join primary louver 250 to cowl 210.

Fluid protection cover 200 is further shown to include a plurality of resting points 270 located within opening 260. Resting points 270 are configured to position fluid protection cover 200 on electronic device 100 by resting on the top surface of device enclosure 110 when cover 200 is installed. Although depicted in FIGS. 4 and 5 as substantially L-shaped and protruding from cowl bottom edge 220, resting points 270 may be any desired shape that retains fluid protection cover 200 in the correct position on device 100.

Figure 6:
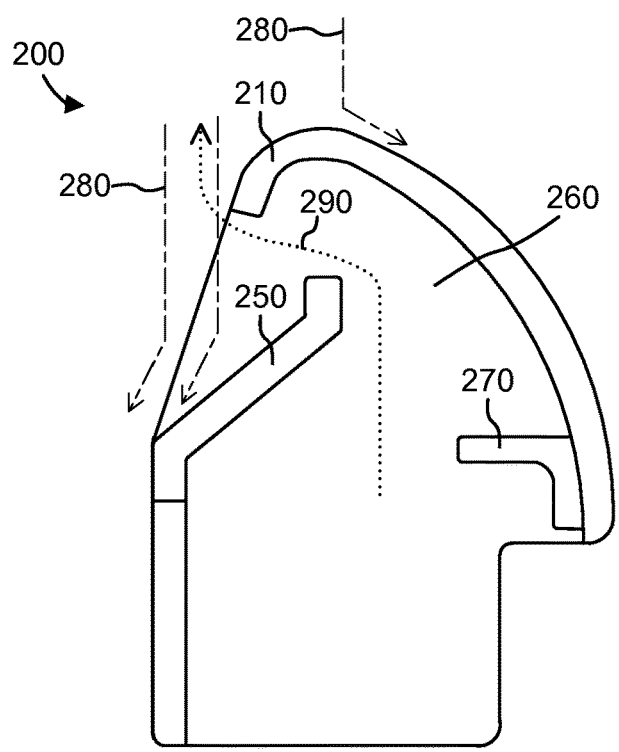
FIG. 6 is a cross-sectional view schematic drawing of the fluid protection cover of FIG. 3 taken along the line labeled "A-A" in FIG. 4, according to an example embodiment.

Turning now to FIG. 6, a side cross-sectional view schematic drawing of fluid protection cover 200 taken along the line labeled "A-A" in FIG. 4 is shown, according to an example embodiment. FIG. 6 depicts exemplary paths of fluid 280 and convection air 290 when cover 200 is installed on device 100. As shown, the features of cover 200 redirect the natural path of fluid 280 either along cowl 210 or primary louver 250 such that fluid is largely prevented from entering opening 260. Convection air 290 originating from vent openings 120 on the top of device 100 may travel upward and outward between cowl 210 and primary louver 250 until it reaches the ambient air.

As described above and depicted in FIG. 6, cowl 210 has an overall curved geometry. The geometry of cowl 210 largely defines the geometry of opening 260. This geometry may be optimized to meet the heat transfer needs of electronic device 100. For example, if opening 260 is too small, the free flow of convection air 290 may be choked, resulting in inadequate heat transfer and overheating of device 100. Conversely, if opening 260 is too large, the risk of fluid ingress may be increased without any corresponding benefit in increased heat transfer from device 100.

Referring now to FIGS. 3-6, fluid protection cover 200 may be formed or constructed from a variety of materials and in a variety of manners. For example, cover 200 may be of unitary construction (i.e., all one piece), where cover 200 may be molded, extruded, cast, formed/machined etc. In an exemplary embodiment, cover 200 may be injection molded as a single component. In another embodiment, cover 200 may be fabricated as separate components. As such, the separate components may be joined by any suitable manner (e.g., a bonding agent, a fastener such as a set screw, a combination thereof, etc.) to form a stacked structure. In addition, cover 200 may be constructed from any suitable material, including, but not limited to, plastic, composites, metal, metal alloys, and/or any combination thereof. In some embodiments, cover 200 may be fabricated from the same material as electronic device enclosure 110.

Figure 7:
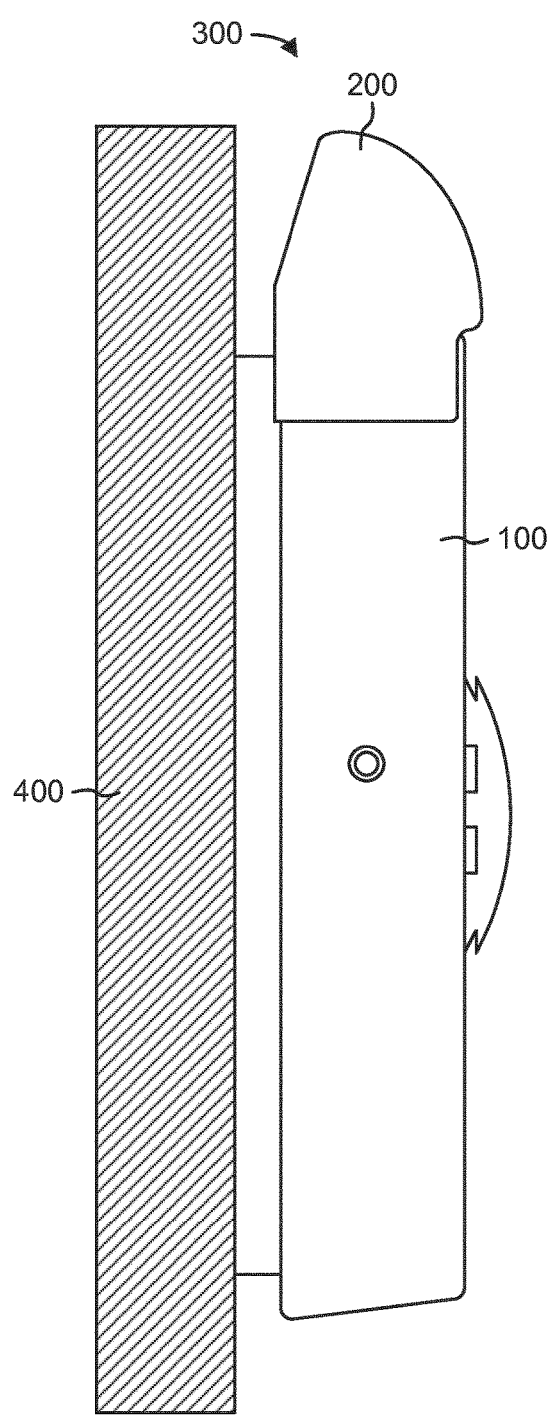
FIG. 7 is a side elevation view schematic drawing of the fluid protection cover of FIG. 3 installed on the electronic device of FIG. 1, according to an example embodiment.

Referring now to FIG. 7, a view of fluid protection cover assembly 300 is depicted in a schematic drawing, according to an example embodiment. Fluid protection cover assembly 300 includes electronic device 100 and fluid protection cover 200, and may be installed on wall 400 such that the rear face of electronic device enclosure 110 is flush with wall 400. As previously described, in some embodiments, fluid protection cover 200 may be a separate component from electronic device 100, permitting assembly 300 to be assembled and disassembled as desired. For example, in some embodiments, it may be necessary to periodically replace a battery in device 100, and thus necessary to remove cover 200 from device 100 in order to access a battery compartment. In other embodiments and as described above, certain features of fluid protection cover 200 may be incorporated into the design of electronic device enclosure 110 such that fluid protection cover assembly 300 is entirely embodied by electronic device 100.

Figure 8:
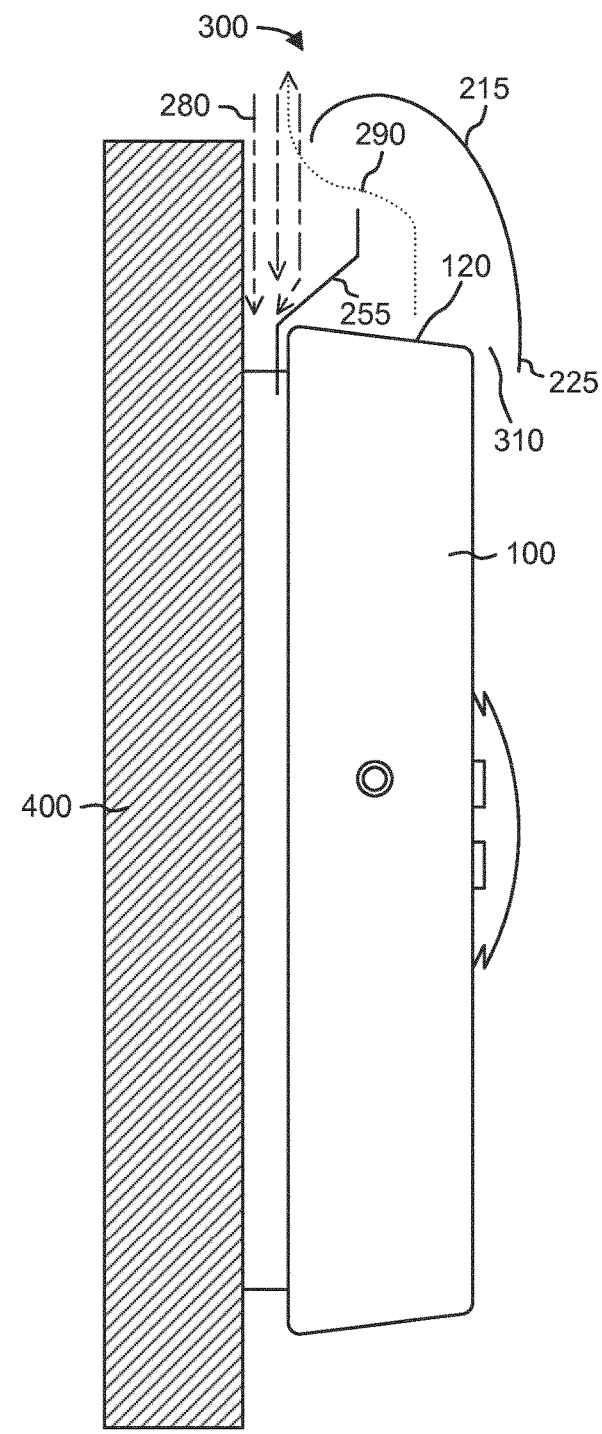
FIG. 8 is a side cross-sectional schematic drawing of the fluid protection cover of FIG. 3 installed on the electronic device of FIG. 1, according to an example embodiment.
Figure 9:
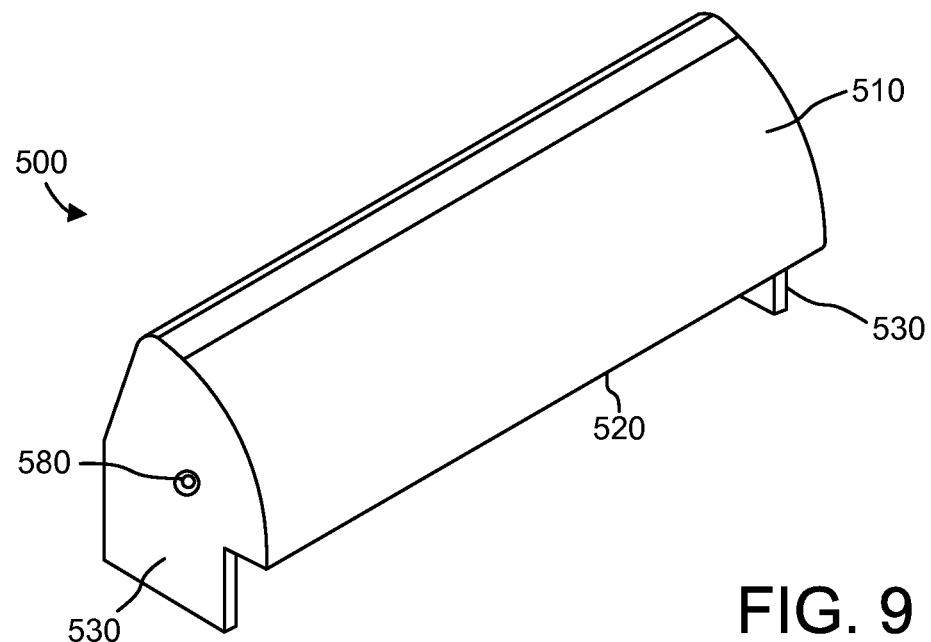
FIG. 9 is a perspective view schematic drawing of a fluid protection cover for an electronic device, according to another example embodiment.

Turning now to FIG. 8, another view of fluid protection cover assembly 300 is depicted in a schematic drawing with a simplified representation of certain features of fluid protection cover 200. The simplified features of cover 200 include cowl 215, bottom edge 225, and primary louver 255. The simplified features are depicted in a side cross-sectional view such that the exemplary paths of fluid 280 and convection air 290 may be better understood. As shown, bottom edge 225 of cowl 215 is not configured to be flush with electronic device 100. Instead, fluid protection cover 200 includes a gap 310 between bottom edge 225 and electronic device 100 such that any fluid that passes through the opening 260 (e.g., splatter) and then travels along inner surface of cowl 215 is not trapped between device 100 and cover 200, increasing the risk that fluid may build up and eventually flow into vent openings 120. Rather, gap 310 affords the fluid an unrestricted path to exit cover 200 harmlessly across the front face of electronic device enclosure 110.

Turning now to FIGS. 9-12, several views of another fluid protection cover 500 are depicted in schematic drawings, according to an example embodiment. Fluid protection cover 500 may include the same or substantially the same geometry as the geometry described above with reference to cover 200 (e.g., cowl 510, cowl bottom edge 520, end caps 530, cowl top edge 540, primary louver 550, opening 560, and resting points 570 are substantially similar to the corresponding features of cover 200). However, fluid protection cover is further shown to include additional features intended to aid in the retention of cover 500 on device 100, as well as the disassembly therefrom. These features include cover removal holes 580, recesses 585, and retention features 590.

Figure 11:
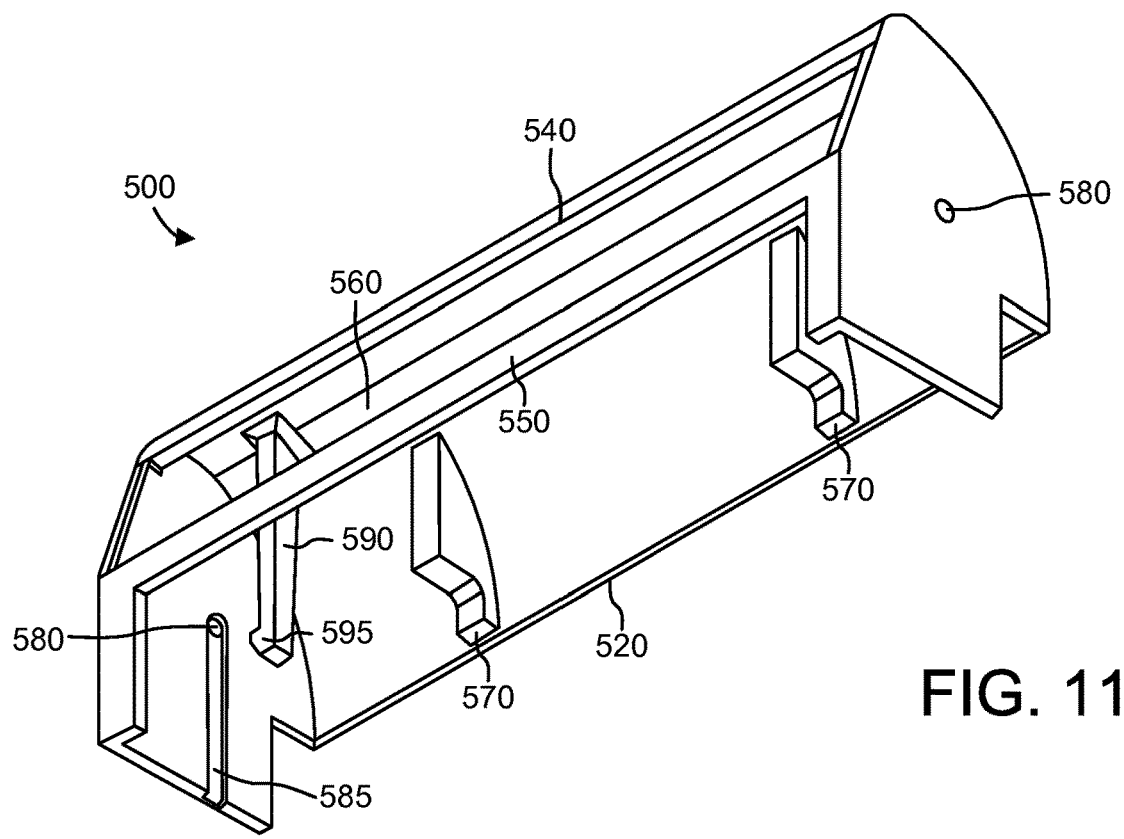
FIG. 11 is another perspective view schematic drawing of the fluid protection cover of FIG. 9, according to an example embodiment.

In some embodiments, retention features 590 are configured to prohibit disassembly of electronic device 100 and fluid protection cover 500 without the use of a removal tool. For example, these features may be configured to extend into vent holes 120 and snap onto an interior face or feature of electronic device enclosure 110. As depicted in FIG. 11, the retention features 590 of cover 500 may have a prong-like geometry, extending from the inner surface of cowl 510 and terminating at notched ends 595. When cover 500 is inserted over device 100, notched ends 595 may contact an inner surface of electronic device enclosure 110 and lock cover 500 into position relative device 100. Although cover 500 is depicted with snap fit retention features 590, in other embodiments, any type of suitable attachment mechanism may be utilized to retain cover 500 on device 100 (e.g., removable or non-removable adhesives, mechanical fasteners).

Retention features 590 may be further configured to exhibit some spring-like properties. For example, in order to disassemble cover 500 and device 100, a user may insert a tool (e.g., a screwdriver) or other device through a removal hole 580 to compress retention feature 590 such that notched end 595 breaks contact with the interior face or feature of device enclosure 110. Once contact retention feature 590 has been moved to an unlocked position, cover 500 may be removed from device 100. In some embodiments, cover 500 may further include recesses 585 terminating at removal holes 580 on the interior faces of end caps 530. In some embodiments, recesses 585 may provide an egress path for any fluid that enters cover 500 through hole 580.

Figure 10:
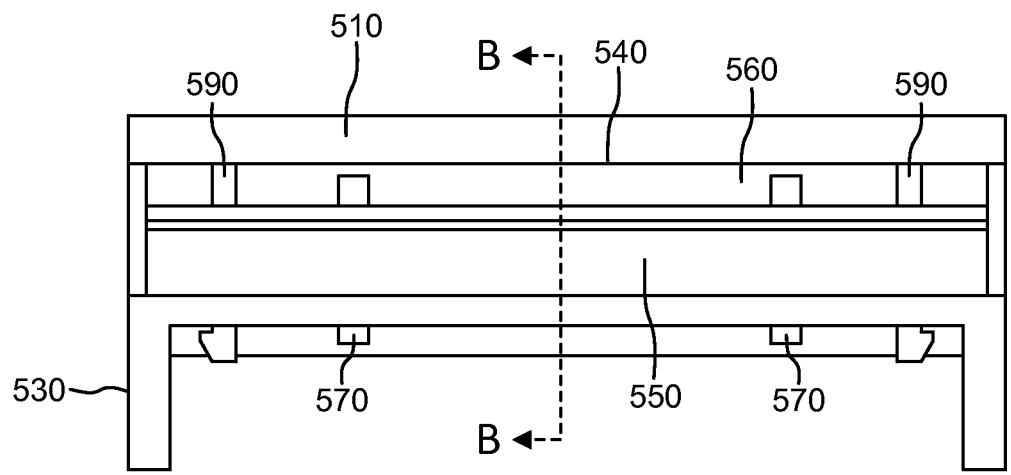
FIG. 10 is a rear elevation view schematic drawing of the fluid protection cover of FIG. 9, according to an example embodiment.
Figure 12:
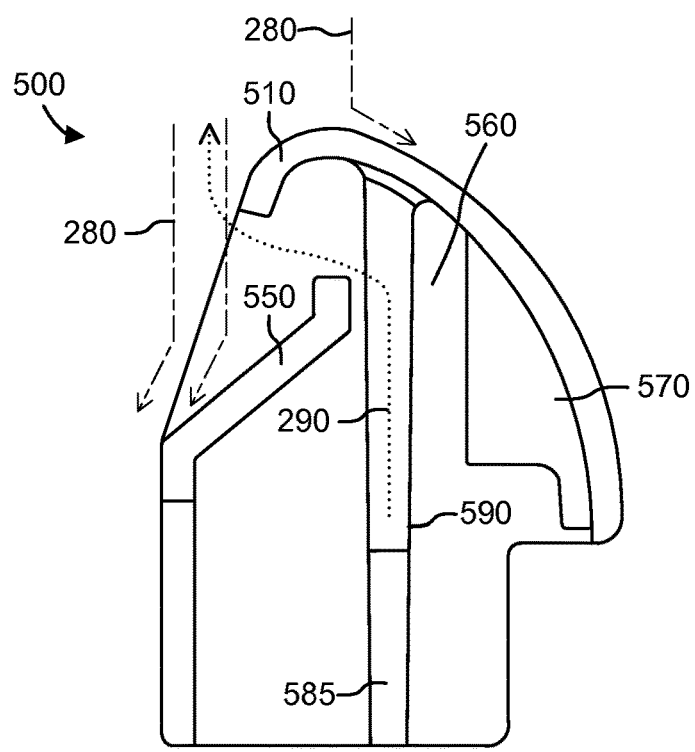
FIG. 12 is a cross-sectional view schematic drawing of the fluid protection cover of FIG. 9 taken along the line labeled "B-B" in FIG. 10, according to an example embodiment.

Referring now to FIG. 12, a side cross-sectional view schematic drawing of fluid protection cover 500 taken along the line labeled "B-B" in FIG. 10 is shown, according to an example embodiment. Similar to FIG. 6, FIG. 12 depicts exemplary paths of fluid 280 and convection air 290. As described above, fluid 280 is directed to flow down cowl 510 or primary louver 550 while convection air passes between cowl 510 and primary louver 550 to reach the ambient air. FIG. 12 additionally depicts an alternate geometry for resting points 570 than the geometry of resting points 270 depicted in FIGS. 5-6.

Figure 13:
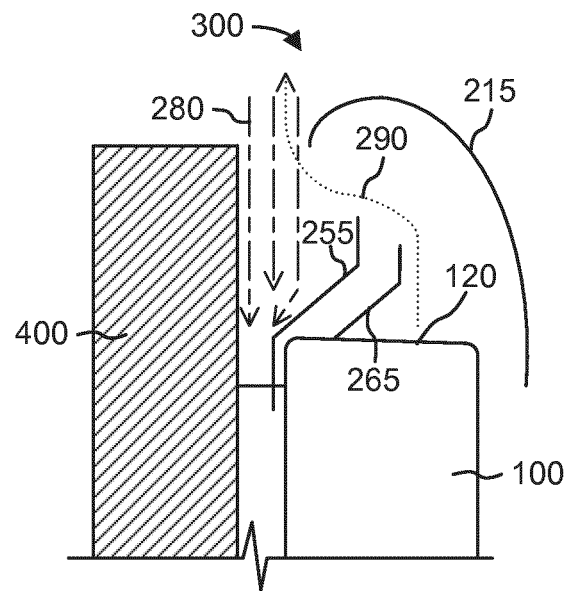
FIGS. 13-14 are additional side cross-sectional schematic drawings of the fluid protection cover of FIG. 3 installed on the electronic device of FIG. 1, according to example embodiments.
Figure 14:
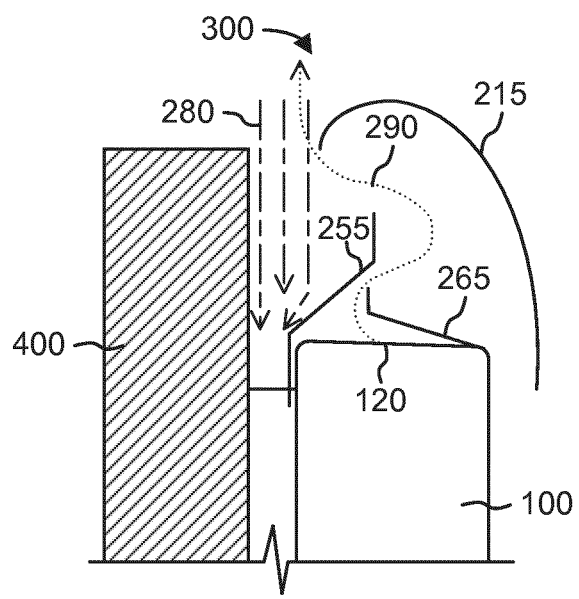

Referring now to FIGS. 13 and 14, additional side cross-sectional views of fluid protection cover 200 depicting secondary louvers 265 are shown, according to example embodiments. Secondary louvers 265 are located below primary louvers 255 and are configured to provide additional defense against fluid ingress by directing any fluid that enters cowl 215 away from vent openings 120. For example, as shown in FIG. 13, secondary louver 265 includes substantially the same geometry as primary louver 255, with the inclined face of secondary louver 265 directing fluid toward the back face of device enclosure 110 and the wall 400. As shown in FIG. 14, the inclined face of secondary louver 265 may instead be horizontally mirrored relative to primary louver 255, with the inclined face directing fluid toward the front face of electronic device enclosure 110. Although FIGS. 13 and 14 each depict cover 200 with a single secondary louver 265, cover 200 may contain any number of secondary louvers 265 required to provide adequate protection against fluid ingress. In addition, although FIGS. 13 and 14 depict secondary louvers 265 included with fluid protection cover 200, secondary louvers 265 may also be included with fluid protection cover 500.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. Other substitutions, modifications, changes, and omissions may be made in the design, operating conditions and arrangement of the exemplary embodiments without departing from the scope of the present disclosure.

What is claimed is:

1. A fluid protection cover for an electronic device, the fluid protection cover comprising:
    a cowl comprising a top surface extending between a top edge and a bottom edge and configured to face generally vertically upward, the cowl configured to fit at least partially over an electronic device enclosure and shield a convection vent opening in the electronic device enclosure against fluid ingress, the top surface directing fluid on the top surface to one of the top edge and the bottom edge;
    a cavity located between the cowl and the enclosure and configured to permit passage of air from an interior region of the electronic device enclosure to ambient air;
    a primary louver located between the cowl and the enclosure and comprising an upward facing surface inclined relative to vertical and configured to receive fluid from the top edge and direct the fluid away from the cavity; and a first end cap and a second end cap; wherein each end cap is configured to fit at least partially over an exterior face of the electronic device enclosure and join the cowl to the primary louver.

2. The fluid protection cover of claim 1, wherein the cowl has a substantially curved shape configured to minimize an amount of cleaning fluid extracted from a cleaning fluid applicator.

3. The fluid protection cover of claim 1, wherein the upward facing inclined surface of the primary louver further comprises a lip located vertically below the cowl and configured to prevent fluid from splashing into the convection vent opening.

4. The fluid protection cover of claim 1, wherein the fluid protection cover is maneuverable between a locked position and an unlocked position, and wherein the locked position is configured to prevent the fluid protection cover from being removed from the electronic device enclosure.

5. The fluid protection cover of claim 4, further comprising a retention feature configured to retain the fluid protection cover in the locked position.

6. The fluid protection cover of claim 5, wherein the retention feature comprises a plurality of prongs extending from the cowl, wherein the prongs are configured to pass through the convection vent opening in the electronic device enclosure and engage at least one surface located in the interior region of the electronic device enclosure.

7. The fluid protection cover of claim 6, wherein at least one of the first end cap and the second end cap further comprises a hole configured to permit passage of a tool configured to deflect the prongs and disengage the fluid protection cover from the electronic device enclosure.

8. The fluid protection cover of claim 7, wherein at least one of the first end cap and the second end cap further comprises a recess terminating at the hole, wherein the recess is configured to direct fluid passing through the hole away from the convection vent opening in the electronic device enclosure.

9. The fluid protection cover of claim 5, wherein the retention feature is an adhesive.

10. The fluid protection cover of claim 1, further comprising a plurality of secondary louvers located underneath the cowl, wherein the secondary louvers are configured to direct fluid away from the convection vent opening in the electronic device enclosure.

11. The fluid protection cover of claim 1, wherein the cowl is further configured to form a gap between the bottom edge of the cowl and a face of the electronic device enclosure to permit egress of fluid.

12. An enclosure for an electronic HVAC device, the enclosure comprising:
  a body comprising:
    an interior region configured to substantially encapsulate electronic components; and
    a plurality of convection vent openings configured to permit air passage out of the interior region;
  a cowl configured to shield at least one convection vent opening and including a top surface extending between a top edge and a bottom edge, the cowl configured to direct fluid along the top surface to at least one of the top edge and the bottom edge;
  a cavity located underneath the cowl and configured to permit passage of convection air from the at least one convection vent opening to ambient air; and
  a primary louver comprising an upper edge spaced inward relative to the top edge of the cowl to define a gap, and an inclined surface configured to receive the fluid from the top edge and direct fluid away from the cavity.

13. The enclosure of claim 12, wherein the cowl has a substantially curved shape configured to minimize an amount of cleaning fluid extracted from a cleaning fluid applicator.

14. The enclosure of claim 12, wherein the primary louver further comprises a lip terminating at the upper edge and located inside the cavity and configured to prevent fluid from splashing into the at least one convection vent opening.

15. The enclosure of claim 12, further comprising a plurality of secondary louvers located underneath the cowl, wherein the secondary louvers are configured to direct fluid away from the at least one convection vent opening.

16. The enclosure of claim 12, wherein the gap is configured to permit egress of fluid.

17. A system for protecting an electronic device from fluid ingress, the system comprising:
  an electronic device comprising a vented enclosure configured to substantially encapsulate electronic components; and
  a fluid protection cover configured to fit at least partially over the electronic device; wherein the fluid protection cover comprises:
    a cowl configured to shield the vented enclosure, the cowl comprising a top surface extending from a top edge to a bottom edge and configured to direct fluid along the top surface of the cowl to one of the top edge and the bottom edge;
    a cavity configured to permit convection air currents to exit the vented enclosure; and
    a louver located underneath the cowl and including a lip defining an upper-most edge of the louver, the louver configured to receive fluid from the top edge and direct fluid away from the cavity and prevent fluid from splashing onto the vented enclosure, the lip being positioned to an inward side of the top edge of the cowl and at least a portion of the primary louver being positioned outward of the cowl on an outward side of the top edge.

18. The system of claim 17, wherein the electronic device is a thermostat.

19. The system of claim 17, wherein the electronic device is an environmental sensor.

20. The system of claim 17, wherein the lip at least partially defines a gap between the louver and the cowl.

21. The fluid protection cover of claim 1, wherein a portion of the primary louver extends horizontally outward past the top edge of the cowl.

* * * * *